US007314491B2

United States Patent
Guenthner et al.

(10) Patent No.: US 7,314,491 B2
(45) Date of Patent: Jan. 1, 2008

(54) ENCAPSULATION OF LARGE NATIVE OPERATING SYSTEM FUNCTIONS AS ENHANCEMENTS OF THE INSTRUCTION SET IN AN EMULATED CENTRAL PROCESSOR SYSTEM

(75) Inventors: Russell W. Guenthner, Glendale, AZ (US); Rodney B. Schultz, Phoenix, AZ (US); F. Michel Brown, Glendale, AZ (US); Stefan R. Bohult, Phoenix, AZ (US); William J Brophy, Buena Vista, CO (US)

(73) Assignee: Bull HN Information Systems Inc., Billerica, MA (US)

( * ) Notice: Subject to any disclaimer, the term of this patent is extended or adjusted under 35 U.S.C. 154(b) by 374 days.

(21) Appl. No.: 11/025,639

(22) Filed: Dec. 29, 2004

(65) Prior Publication Data
US 2006/0165094 A1 Jul. 27, 2006

(51) Int. Cl.
*G06F 9/455* (2006.01)
(52) U.S. Cl. .......................... 730/26; 717/136; 717/138; 717/140; 717/139; 709/107; 707/6
(58) Field of Classification Search .................. 703/26, 703/27; 717/138, 140, 139, 136; 709/107; 707/6; 712/208; 710/1
See application file for complete search history.

(56) References Cited

U.S. PATENT DOCUMENTS

| | | | |
|---|---|---|---|
| 6,457,171 B1 * | 9/2002 | Mann et al. ................. | 717/138 |
| 6,480,845 B1 * | 11/2002 | Egolf et al. .................... | 707/6 |
| 6,961,843 B2 * | 11/2005 | O'Connor et al. ........... | 712/208 |
| 2002/0032718 A1 * | 3/2002 | Yates et al. .................. | 709/107 |
| 2002/0133810 A1 * | 9/2002 | Giles et al. .................. | 717/138 |
| 2003/0093776 A1 * | 5/2003 | Hilton .......................... | 717/138 |
| 2004/0177346 A1 * | 9/2004 | Cannon et al. .............. | 717/136 |
| 2004/0181785 A1 * | 9/2004 | Zwirner et al. ............. | 717/140 |
| 2005/0086650 A1 * | 4/2005 | Yates et al. .................. | 717/139 |
| 2005/0091029 A1 * | 4/2005 | Traut ........................... | 703/27 |
| 2005/0246453 A1 * | 11/2005 | Erlingsson et al. ............ | 710/1 |

OTHER PUBLICATIONS

Hatrig, H, "Security architectures revisited", ACM, Jul. 2002.*
Desoli et al., "DELI: A new run-time control point", IEEE 2002.*
Whitaker et al., "Scale and performance in the Denali Isolation Kernel", ACM 2002.*
Le Vasseur et al., "A sledgehammer Approach to reuse of legacy device drivers", ACM, Sep. 2004.*

* cited by examiner

*Primary Examiner*—K. Thangavelu
(74) *Attorney, Agent, or Firm*—James H. Phillips; Russell W. Guenthner; Faith F. Driscoll

(57) ABSTRACT

This invention relates to the art of computer system emulation and, more particularly, to a computer system emulator in which the functions normally performed by the hardware in a legacy central processor unit are emulated by a software program. The invention is to enhance the emulated instruction set beyond that of the legacy machine such to include as new single instructions a method for invoking operating system functions, with the machine coding of the operating system functions now being performed by machine code native to the new host machine, rather than as a sequence of emulated legacy instructions.

17 Claims, 5 Drawing Sheets

**Machine Code of the Operating System using
Legacy Instrucions to Perform a Function**

100

Instructions in Mnemonic Form

101  A101  LDA
     A102  ADA
     A103  STA
     A104  TSX1

105  A105  STX1  Beginning of FX1 function
     A106  LDQ
     A107  ADQ
     A108  SBQ
     A109  STQ
     ...    ...
     ...    ...
     A201  ADX1  More Instructions inside FX1
     A202  ...
203  A203  ...      End of FX1

A204         Instructions after FX1 function
     A205  ...
206  A206  ...

Legacy Function FX1
300

*FIG. 2*

Machine Code of the Operating System 2000
utilizing the newly defined FX1 instruction

Instructions in Mnemonic Form

101
    A101  LDA
    A102  ADA
    A103  STA
    A104  TSX1

2105  A105  FX1    Instruction to Invoke FX1 function ⬅——— New Function FX1

2106  A106         Instructions after FX1 function      301
    A107 ...
2108  A108 ...

*FIG. 3*

Instructions in Mnemonic Form

| | | |
|---|---|---|
| 101 | A101 | LDA |
| 102 | A102 | ADA |
| 103 | A103 | STA |
| 104 | A104 | TSX1 |
| 105 | A105 | LDQ  Beginning of FX1 function |
| 106 | A106 | ADQ |
| 107 | A107 | SBQ |
| 108 | A108 | STQ |
| | A109 | STX1 |
| | ... | ... |
| | ... | ... |
| | A201 | ADX1 More Instructions inside FX1 |
| | A202 | ... |
| 203 | A203 | ...      End of FX1 |
| | A204 | Instructions after FX1 function |
| | A205 | ... |
| 206 | A206 | ... |

Function FX1
300

Steps to Perform an Operating System Function using Emulation of a Sequence of Legacy Instructions

310
- Fetch Instruction A105
- Interpret machine code of instruction
- Form Address specified by instruction
- Fetch operand from address specified
- Perform Function specified by opcode of instruction
- Increment Instruction Counter to prepare next instruction 311
- Fetch Instruction A106 ... do similar processing as for A105
- continue processing of all instructions through A203

312  continue with instruction A203 (after FX1 function)

*FIG. 4*

Instructions in Mnemonic Form with new single instruction for Operating System Function FX1

```
101   A101  LDA
      A102  ADA
      A103  STA
      A104  TSX1

2105  A105  FX1   Instruction to Invoke FX1 function
2106  A106        Instructions after FX1 function
      A107  ...
2108  A108  ...
```

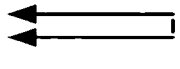

Function FX1
301

Fetch Instruction A105
Interpret machine code of instruction
   Perform FX1 Function specified by opcode of instruction
      (in machine code running directly on host system)

continue with instruction A106 (after FX1 function)

*FIG. 5*

ENCAPSULATION OF LARGE NATIVE OPERATING SYSTEM FUNCTIONS AS ENHANCEMENTS OF THE INSTRUCTION SET IN AN EMULATED CENTRAL PROCESSOR SYSTEM

RELATED PATENT APPLICATIONS

1. Application Ser. No. 20040111551 titled "Process for Emulating Associative Memory" invented by Bruce A. Noyes filed on Jun. 10, 2004.
2. Application Ser. No. 20060155524 titled "Instructions to Load and Store Containing Words in a Computer System Emulator with Host Word Size Larger than that of the Emulated Machine", invented by Russell W. Guenthner, et. al. filed on Dec. 7, 2004.
3. Application Ser. No. 20070156391 titled "Host Computer System Emulating Target System Legacy Software and Providing for Incorporating More Powerful Application Program Elements into the flow of Legacy Software", invented by Russell W. Guenthner, et. al. filed on Dec. 29, 2005.

FIELD OF THE INVENTION

This invention relates to the art of computer system emulation and, more particularly, to a computer system emulator in which the functions normally performed by the hardware in a central processor unit are emulated by a software program.

BACKGROUND OF THE INVENTION

Users of mainframe computers running a proprietary operating system may have a very large investment in proprietary application software and, further, may be comfortable with using the application software because it has been developed and improved over a period of years, even decades, to achieve a very high degree of reliability and efficiency.

As manufacturers of very fast and powerful commodity processors continue to improve the capabilities of their products, it has become practical to emulate the proprietary operating systems of powerful older computers such that the manufacturers of the older computers can provide new systems which allow the users to continue to use their highly-regarded proprietary software by emulating the older or "legacy" computer and in particular the central processing units of the legacy system. Accordingly, computer system manufacturers are developing such emulator systems for the users of their legacy systems, and the emulation process used by a given system manufacturer is itself subject to ongoing refinement and increases in efficiency and reliability.

SUMMARY OF THE INVENTION

According to the teachings of the present invention, several advantages will now be described along with specific objects and the manner in which they are achieved in the following paragraphs.

In one specific state-of-the-art example, a 64-bit Itanium Intel processor is used to emulate the Bull DPS 9000 36-bit memory space and the GCOS 8 instruction set of the Bull DPS 9000. Within the memory space of the emulator, the 36-bit word of the DPS 9000 is stored right justified (least significant bits) in the least significant 36 bits of the "host" (Itanium) 64-bit word. The upper 28 bits of the 64-bit word are typically zero for "legacy" code. Sometimes, certain specific bits in the upper 28 bits of the containing word are used as flags or for other temporary purposes, but in normal operation these bits are usually zero and in any case are typically viewed by older programs in the "emulated" view of the world as being non-existent. That is, only the emulation program itself uses these bits.

For some purposes, such as providing new or more direct communication with programs or services running in the 64-bit system, it is advantageous to provide the emulated system with full access to the entire "containing" word, which in this case is the 64-bit containing word, for purposes of both loading or storing the 64-bit word from the viewpoint of the emulated software into visible space within the 36-bit environment. The capability of viewing and manipulating 64 bits can also be used to improve the machine architecture by such expedients as adding new opcodes with more functionality, increasing the address space, or other similar things which can utilize more bits in the instruction or data words.

It is also possible to enhance the basic instruction set of the newly defined system beyond what was provided in the older legacy system. Opcodes can be selected and their functionality can be defined in the emulation program which extends the instruction set beyond, or even far beyond the functionality of the original "legacy" system. This can be done by either enhancing or enriching the functionality of the opcodes already defined on the legacy system, or by utilizing previously unused opcodes to specify new functionality.

The present invention is directed to achieving this end, that is, to enhance the instruction set of the new emulated system to include functionality which encompasses that previously performed by the operating system using only the older legacy instructions. The purpose of the invention is to increase performance of the emulated system, and in particular to increase the performance of programs which make heavy or large use of the operating system to perform the processing required by that program.

OBJECTS OF THE INVENTION

It is therefore a broad object of this invention to increase the performance of a computer system. This object is achieved in the illustrated embodiment by defining new opcodes which enhance the instruction set of an emulated central processor unit with these new opcodes implementing functionality previously performed by a sequence of legacy instructions inside the code of the operating system.

It is another broad object of this invention to improve the performance of the emulated ventral processor unit and also the performance of the emulated system. This object is achieved by writing programs or subroutines which will run in native machine code on the host system to perform the functions previously performed by the original operating system in a manner which surpasses the performance that could be achieved by emulating a sequence of the original legacy instructions which performed the original function. Typically, one newly defined instruction will replace the functionality of a section of original operating system code that would require the processing of many legacy instructions.

According to the teachings of this invention, two types of new opcodes are provided. The first type is to newly utilize previously unused opcodes or other encoding of the original legacy instruction word to specify and provide functionality which was previously provided by a sequence of instructions in the original legacy operating system code. The second type is to utilize unused bits in the host instruction word to define new instructions and new functionality that replaces original operating system code. Both of these instruction formats allow for increased performance by allowing for host system machine code to replace a sequence of emulated legacy instructions with a single instruction. Use of previously unused bits in the host system word, also allows for the overall encoding of the instructions to be less compact which in turn allows for faster decode and quicker determination of the precise work to be done by the code of the emulation system.

Briefly, these and other objects of the invention are achieved by providing new opcodes or other means of encoding the specification of new functionality into the instruction set of an emulated processing unit in an emulated computer system. The newly added opcodes specifically implement functionality previously performed by the legacy operating system with performance improvement of the overall system being achieved through more efficient coding of operating system functions in a language or machine code native to the host system, instead of the prior art approach of interpreting a series of legacy instructions. This approach enables more efficient coding with resulting improved performance of the overall computer system.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 2 is an annotated listing fragment showing a section of operating system code in a legacy system which is a candidate for being replaced by a single instruction in the equivalent operating system code for a new computer system in which the central processing unit hardware is replaced by a software program which emulates functions of the processor unit.

FIG. 3 is an annotated listing fragment showing the instructions of the operating system machine code that are required after application of the invention in which many legacy instructions to perform a function are replaced by a single instruction which invokes the function implemented in the machine code of the host system.

FIG. 4 is an annotated listing fragment and diagram showing some typical exemplary processing required by an emulation program to process a sequence of instructions with that sequence of instructions implementing a specific section of operating system code. This diagram is an example of the prior art approach.

FIG. 5 is an annotated listing fragment and diagram showing typical processing required by the emulation system program after application of the invention in which a section of operating system code is replaced by a single instruction thus allowing for increased performance through more efficient coding.

DESCRIPTION OF THE PREFERRED EMBODIMENT(S)

Figure 1:
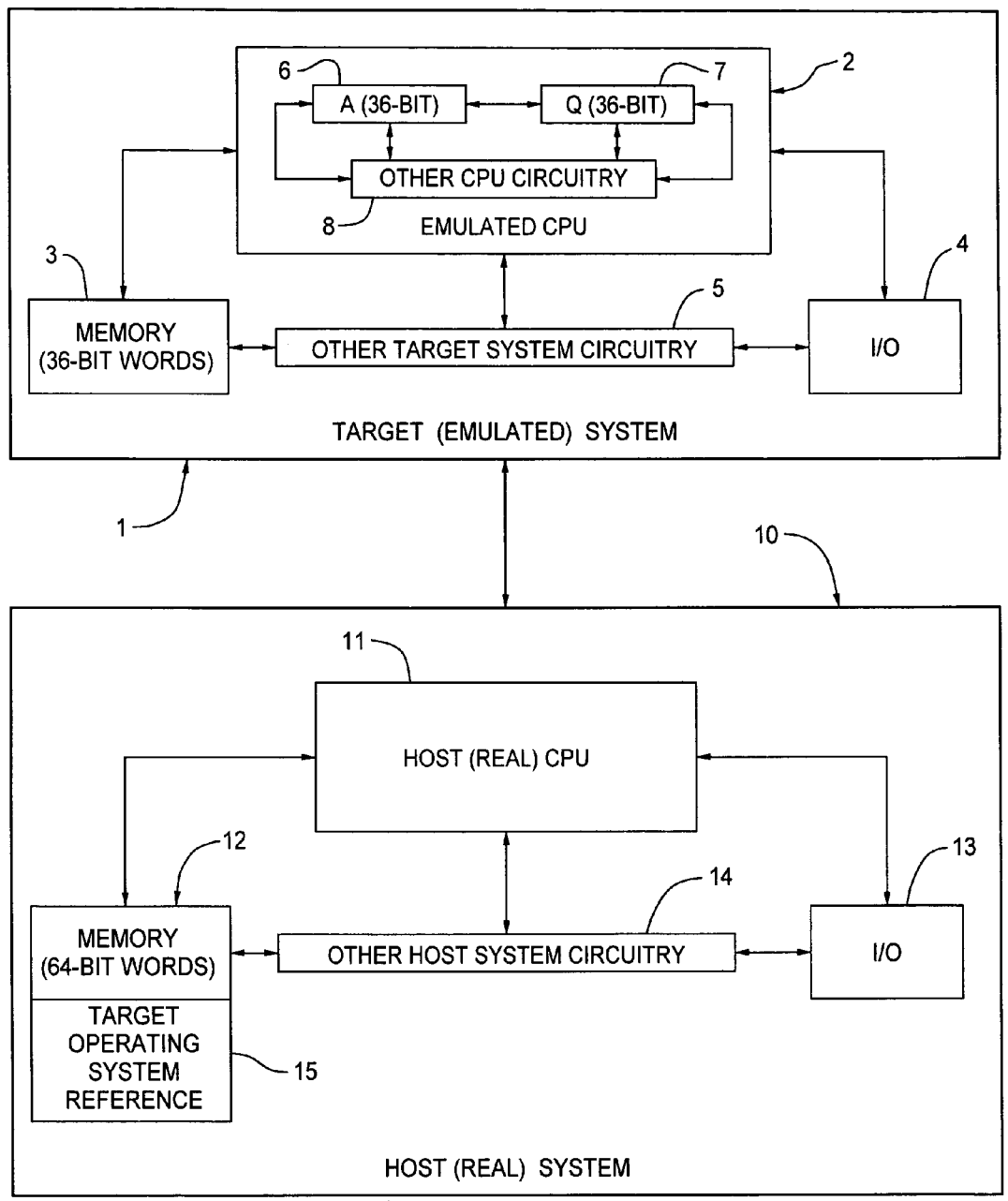
FIG. 1 is a block diagram showing a virtual target system emulated in a host system.

FIG. 1 illustrates an exemplary environment in which the invention finds application. More particularly, the operation of a target (emulated) system, which does not actually physically exist, is emulated by a host (real) system 10. The target system 1 includes an emulated central processing unit (CPU) 2, an emulated memory 3, emulated input/output (I/O) 4 and other emulated system circuitry 5. The emulated CPU 2 incorporates program visible registers such as accumulator "A" and supplementary accumulator "B" registers, 6, 7, respectively, as well as other CPU circuitry 8. The host (real) system 10 includes a host CPU 11, a host memory 12, host I/O 13 and other host system circuitry 14. The host memory 12 includes a dedicated target operating system reference space 15 in which the elements and components of the emulated system 1 are represented in one or more individual words each.

The target operating system reference space 15 also contains suitable information about the interconnection and interoperation among the various target system elements and components and a complete directory of the target system operating system commands which includes information on the steps the host system must take to "execute" each target system command in a program originally prepared to run on a physical machine using the target system operating system. It can loosely be considered that, to the extent that the target system 1 can be said to "exist" at all, it is in the target operating system reference space 15 of the host system memory 12.

Thus, an emulator program running on the host system 2 can replicate all the operations of an application program written for the target system operating system as if the application program were running on a physical target system.

Referring now to FIG. 2, operating system cods is often written in assembly language, but may also be written in a higher level language such as C, C++ or any other computer language. When the operating system code has been compiled or assembled and is actually running it exists as machine code 100 in the computer system memory space, either virtual or real, as a sequence or series of instructions. In FIG. 2 such a sequence of instructions is illustrated as instructions at addresses/locations A101 101 through A206 206. Within such a sequence there may be branches or transfer instructions which cause the processing machine to proceed non-sequentially but for purposes of this discussion it will be considered that a section of code as illustrated is tat which performs a specific operating system function. This section of code in the figure is marked as function "FX1" 300 and the function is performed by instructions at addresses/locations A105 105 through A203 203. Typically, the section of code which implements a specific operating system function might be a subroutine with certain arguments and parameters passed to it by the calling routine, in a manner well known in the state of the art.

FIG. 3 is a listing fragment showing the instructions of the operating system machine code that are required after application of the invention. In this diagram instructions at addresses/locations A101 101 through A104 104 are the same as in FIG. 1. Instruction FX1 at address A105 marked as in location 105 in FIG. 2 is no longer the beginning of the legacy instructions which did the processing for function FX1 300, but is instead replaced by a new instruction at location 2105 which is the machine code tat invokes the newly defined FX1 301 instruction. Instructions at addresses/locations A106 2106 through A108 2108 are now the instructions immediately after function FX1 processing which were at addresses/locations A204 204 through A206 206 in FIG. 1. Instructions from addresses/locations A105 105 through A203 203 in FIG. 1 have been replaced by a single instruction at address/location A105 2105 in FIG. 2.

FIG. 4 is a listing fragment showing the typical processing that must be performed by a software program emulating the instruction set of a legacy processing unit in order to process to sequence of legacy instructions implementing function "FX1" 300 from FIG. 1. Within the instructions of function FX1 300 instructions such as LDQ at location 105, ADQ at location 106, SBQ at location 107, STQ at location 108 and others as shown are processed by the emulation system. Exemplary steps typically involved in processing each instruction may include 1) the fetch of the instruction word from the emulated system memory, 2) the interpretation of the machine code from within instruction, 3) the formation of the address specified by the instruction, 4) the fetch of any operand or operands specified by the instruction, 5) the processing or actual execution of the instruction using the fetched operand data, 6) the storing away of any results from the processing into memory or into a register, and 7) the incrementing of the instruction counter for the emulated program and then proceeding to the next instruction. In FIG. 4 these steps 310 are illustrated for the processing of instruction at address/location A105 105 and then similar steps 311 are repeated for processing the remainder of the legacy instructions implementing function FX1 300. Processing then continues in the same manner as indicated in step 312 for the instructions following the FX1 300 function.

FIG. 5 is a listing fragment of the same operating system function where instead of a section of code for the instructions of FX1 as shown in FIG. 2. the machine code for the section is replaced by a single newly defined instruction which performs all the functionality of FX1 as a single emulated instruction. This code is written in a computer language or in assembler such that the machine code for this function is code that runs directly on the hardware of the host machine, rather than being a series of emulated instructions from the legacy instruction set. The performance of this code, being processed directly by the hardware of the host machine is faster and more efficient than the interpretation of a series of legacy instructions.

Any number of pieces of the operating system can be rewritten and compiled and run as native code on the host central processing unit. The original operating system code is modified such that the large sequences of instructions previously used to implement a function are replaced by new single instructions, possibly with arguments, and the code for performing these functions is now in essence part of the emulation system rather than the operating system, although of course conceptually it can be viewed as remaining part of the operating system.

The processing in FIG. 3 and FIG. 4. is exemplary and not in any way intended to limit or restrict the application of the invention to only sequential code.

In a current state-of-the-art example chosen to illustrate the invention, a 64-bit Itanium Intel processor is used to emulate the Bull DPS9000 36-bit memory space and the instruction set of the DPS9000 with its proprietary GCOS 8 operating system. Within the memory space of the emulator, the 36-bit word of the DPS9000 is stored right justified in the least significant 36 bits of the "host" (Itanium) 64-bit word during the emulation process. The upper 28 bits of the 64-bit word are typically zero; however, sometimes, certain specific bits in the "upper" 28 bits of the "containing" word are used as flags or for other temporary purposes. Within the instruction set of the legacy DPS9000 the numbers 3 and 4 (among others) were unused in the legacy instruction set, and a fault was generated if they were encountered. For purposes of improving the performance of the emulated computer system, opcodes 3 and 4 were chosen as a mechanism to implement a call to host native emulation code with the address field of the instruction for opcode 3 indicating which of many operating system functions was being invoked. When opcode number 3 is encountered by the emulation system, one of many new functions as specified by the address field is invoked and processing of that single instruction as part the host native emulation code replaces the processing of many instructions in the original operating system code.

The newly defined instructions for specifying operating system functions are called "hybrid" instructions and these instructions differ from typical instructions from the legacy instruction set. Hybrid instructions would typically be more complex than typical instructions from the legacy instruction set. Hybrid instructions have full access to the resources of the host machine for performing their services, which the instructions of the legacy instruction set typically do not utilize. Hybrid instructions may access files or utilize communication functions of the host operating system. Hybrid functions may use multiple threads to achieve higher degrees of parallelism than can be achieved by attacking a problem with a sequence of legacy instructions. Hybrid functions can utilize recursion and resources for calls and returns that are native to the host system hardware. Hybrid instructions can use internal caching of data and internal variable to avoid recalculation of certain data when that possibility is recognized.

Hybrid functions may be called from only one place in the operating system. That is, since they are replacing a specific section of code, they may be called or invoked only from that specific place in the new source code for the legacy operating system. Thus, the hybrid instructions do not need to be designed and tailored for general use and since they may be invoked from only one place they can be optimized for most efficient operation in precisely the environment from which they are invoked.

Within the functions of the operating system it is possible that the code implementing an operating system function may itself require calls back to the operating system itself. That is, the function may require calls to other operating system functions which may or may not also contain or be implemented with other "hybrid" instructions. This requires that the mechanism of the invention may for some functions require a method or procedure for the saving and subsequent restoring of the program state after the return from the operating system calls. The mechanism must allow for the stacking of program states as the code could be called from multiple places and lower level functions could also themselves make calls to the same function. If the program is written in a higher level language such as C, or C++ then the internal state of the C program must itself be saved as part of the program state so that if the emulated processor is dispatched to another task on behalf of another user, the variables for the processing of the first program must be restored when the first program is resumed.

It may also be required that the implementation of the program for performing the operating system function be given access to the program visible registers, or other internal variables and structures of the emulation program. This can be accomplished in many ways well known in the state of the art such as passing pointers to variable structures as part of the call to the function implementing the program, or by identifying certain structures and variables as being contained in global or common memory space.

It is noted that the invention which replaces sections of operating system code with an alternative implementation in machine code of the host system is not limited to exact replacement of the function, nor does the function have to be precisely or even approximately equivalent to the original function. The application of the invention does not preclude continued improvement in algorithms or in approach to the overall operating system function as legacy code is migrated into instructions which invoke machine code of the host system.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a data processing system in which a legacy processing unit structure and operation within a legacy target computer system operating under control of operating system code is emulated by an emulation software program on a host system that includes a host memory, a mechanism for improving performance of the data processing system comprising:
   A) a function stored in the host memory implemented in native machine code within the emulator software program running on the host system which performs a function previously implemented as a sequence of legacy instructions as part of the operating system code of the legacy system, where said operating system code includes any code provided by a computer system manufacturer; and
   B) an instruction mechanism for invoking said function from within the operating system code newly modified to include the instruction mechanism that replaces the sequence of legacy instructions for use on the legacy target computer system when the newly modified operating system code is subsequently stored in a target operating system reference space of the host memory.

2. The data processing system of claim 1 in which the operating system code is restricted to not include application software.

3. The data processing system of claim 1 in which the instruction mechanism is specified to utilize an unused opcode from the sequence of legacy instructions to invoke the function.

4. The data processing system of claim 1 in which the instruction mechanism is specified to utilize further encoding of existing legacy instructions to invoke the function.

5. The data processing system of claim 1 in which the legacy target computer system utilizes an instruction set and wherein the instruction mechanism is specified to utilize bits of a host word which were not utilized to hold an instruction word of the legacy instruction set.

6. The data processing system of claim 1 in which the host system is an Intel Itanium machine with a 64-bit word size and the emulated legacy target computer system is a Bull DPS9000 machine running a GCOS 8 operating system.

7. The data processing system of claim 1 in which the legacy target computer system has a word length of 36 bits and the host system has a word length of 64 bits.

8. The data processing system of claim 1 in which the legacy target computer system has a word length that is other than a power of 2.

9. A method for improving performance of a computer system performing emulation of a legacy computer system the emulation including emulation of a legacy central processing unit, emulation of processing of instructions of a legacy application program and an original legacy operating system, the emulation performed by an emulation software program running on a host computer system, the host computer system including a host processor and a host system memory, the method comprising the steps of:
   A. including as part of the emulation software program running on the host processor of the host system, new special program code which performs functionality of machine instructions which compose a selected section of original legacy operating system code;
   B. allocating a first portion of host system memory and storing in that portion of host system memory the emulation software program including the new special program code for performing functionality of the selected section of original legacy operating system code;
   C. implement a second improved version of the legacy operating system by substituting in at least one place for machine code of the selected original legacy operating system component within the original legacy operating system code a special function invocation instruction, with said function invocation instruction when recognized by the emulation software program to cause execution of the new special program code which is included as part of the emulation software program;
   D. allocating a second portion of the host system memory and storing in that second portion of memory the second improved implementation of the legacy operating system;
   E. launching or starting the emulation software program;
   F. starting emulation by the emulation software program of execution of instructions of the second improved implementation of the legacy operating system;
   G. invoking the new special program code in the emulation software program running on the host system which performs the function of the selected section of legacy operating system code whenever the special function invocation instruction is encountered by the emulation software program within code of the second improved implementation of the legacy operating system; and thus, achieving improved performance, that is, less time in completing the new special program code when compared to time required to perform the same function through emulation of machine instructions which composed the selected section of original legacy operating system code.

10. The method of claim 9 wherein the special function invocation instruction utilizes an opcode specified to be selected from the set of unused opcodes of the legacy central processing unit instruction set.

11. The method of claim 10 wherein the special function invocation instruction is also specified to utilize no more bits in its instruction word than in the word size of the legacy computer system.

12. The method of claim 10 wherein the special function invocation instruction is specified to utilize more bits in its instruction word than in the word size of the legacy computer system and that these bits are contained within a single word of the host computer system.

13. The method of claim 9 wherein the host machine word length is 64 bits, and the legacy machine word length is 36 bits.

14. The method of claim 9 wherein the new special program code of Step A is written by band in a high level language such as C or C++.

15. The method of claim 9 wherein the new special program code of Step A is written by hand in the machine language of the host system.

16. The method of claim 9 wherein a plurality of sections of the original legacy operating system code are selected for replacement by hand written machine code tailored for execution on the host system.

17. The method of claim 9 wherein a plurality of sections of the original legacy operating system code are selected for replacement by hand written code in a high level language such as C or C++.

* * * * *